US011927456B2

(12) United States Patent
Shah et al.

(10) Patent No.: US 11,927,456 B2
(45) Date of Patent: Mar. 12, 2024

(54) METHODS AND SYSTEMS FOR PROVIDING DYNAMIC IN-VEHICLE CONTENT BASED ON DRIVING AND NAVIGATION DATA (71) Applicant: Rovi Guides, Inc., San Jose, CA (US)

(72) Inventors: Akshay Chetan Shah, Mumbai (IN); Padmassri Chandrashekar, Karnataka (IN); Daina Emmanuel, Bangalore (IN)

(73) Assignee: Rovi Guides, Inc., San Jose, CA (US)

( * ) Notice: Subject to any disclaimer, the term of this patent is extended or adjusted under 35 U.S.C. 154(b) by 348 days.

(21) Appl. No.: 17/331,815

(22) Filed: May 27, 2021

(65) Prior Publication Data

US 2022/0381580 A1 Dec. 1, 2022

(51) Int. Cl.
*G01C 21/36* (2006.01)
*G01C 21/34* (2006.01)
*G06F 16/29* (2019.01)
*G06Q 30/0251* (2023.01)

(52) U.S. Cl.
CPC ..... *G01C 21/3697* (2013.01); *G01C 21/3484* (2013.01); *G01C 21/3691* (2013.01); *G06F 16/29* (2019.01); *G06Q 30/0266* (2013.01)

(58) Field of Classification Search
CPC ............ G01C 21/3697; G01C 21/3484; G01C 21/3691; G06F 16/29; G06Q 30/0266
See application file for complete search history.

(56) References Cited

U.S. PATENT DOCUMENTS

| 8,125,334 | B1 | 2/2012 | Loyal et al. | |
| 11,238,497 | B2* | 2/2022 | Brown | G06Q 30/0265 |
| 2014/0111647 | A1* | 4/2014 | Atsmon | G08G 1/14 |
| | | | | 348/148 |
| 2014/0257989 | A1* | 9/2014 | Prakah-Asante | G01C 21/3484 |
| | | | | 705/14.63 |
| 2016/0247200 | A1* | 8/2016 | Yamaguchi | G06Q 30/0266 |
| 2017/0124407 | A1 | 5/2017 | Micks et al. | |
| 2017/0255966 | A1* | 9/2017 | Khoury | B60W 40/00 |
| 2017/0371608 | A1* | 12/2017 | Wasserman | G07C 5/008 |
| 2018/0061230 | A1* | 3/2018 | Madigan | G08G 1/08 |
| 2019/0220014 | A1 | 7/2019 | Bradley et al. | |
| 2019/0268743 | A1* | 8/2019 | Cho | H04W 4/44 |
| 2020/0120371 | A1 | 4/2020 | Sen et al. | |
| 2021/0312500 | A1* | 10/2021 | Krishnamurthy | G06Q 30/0255 |

FOREIGN PATENT DOCUMENTS

WO WO-2012089284 A2 * 7/2012 ......... G01C 21/3697

* cited by examiner

*Primary Examiner* — Jess Whittington
*Assistant Examiner* — Gabriel Joseph Rene Lambert
(74) *Attorney, Agent, or Firm* — HALEY GUILIANO LLP (57) ABSTRACT Systems and methods are presented for providing dynamic in-vehicle content. A path of a vehicle is predicted, and an intersection is identified along the predicted path. Based on vehicle status data, a determination is made as to whether the vehicle is decelerating along the predicted path within a threshold distance of the intersection. In response to determining that the vehicle is decelerating along the predicted path within the threshold distance of the intersection, a further determination is made as to whether a geographical location of the intersection is associated with a content item. In response to determining that the geographical location of the intersection is associated with the content item, the content item is presented via an entertainment device of the vehicle.

20 Claims, 7 Drawing Sheets

METHODS AND SYSTEMS FOR PROVIDING DYNAMIC IN-VEHICLE CONTENT BASED ON DRIVING AND NAVIGATION DATA

BACKGROUND

The present disclosure relates to methods and systems for providing dynamic in-vehicle content and, more particularly, to methods and systems for providing dynamic in-vehicle content based on driving and navigation data.

SUMMARY

A vehicle's entertainment system may consume customized playlists when traveling between locations. For example, the playlists may be customized based on the occupants' interests, the geography of the occupants' vehicle, and preferences. These customized playlists may include radio, audio, video or any other content. Typically, the playlists may be customized to play local content to an area where the vehicle is located, however, such customization does not factor in the dynamics of travel, including the speed and direction of the vehicle. For example, while traveling between locations, there may be red lights where the vehicle occupant might not pay much attention to the road. Merchants, who want to achieve a high engagement with their consumers, do not have the ability to insert their advertisements during such periods when the vehicle occupants might not pay much attention to the road. Typically, advertisements may be arbitrarily inserted during periods when the occupants may be too busy to consume advertisements, thereby reducing their effectiveness. Ultimately, dynamic in-vehicle content based on driving and navigation data is needed to improve user engagement.

To overcome these problems, methods and systems are disclosed herein for providing dynamic in-vehicle content based on driving and navigation data. In some embodiments, the system predicts a path of a vehicle, and identifies an intersection (e.g., traffic signal) along the predicted path. The system further determines, based on vehicle status data, whether the vehicle is decelerating along the predicted path within a threshold distance (e.g., 1 mile, 2 miles or any preselected distance) of the intersection. Based on determining that the vehicle is decelerating along the predicted path within the threshold distance of the intersection, the system determines whether a geographical location of the intersection is associated with a content item (e.g., advertisements), and, in response to determining that the geographical location of the intersection is associated with the content item, causing presentation of the content item via an entertainment device of the vehicle. For example, a merchant (e.g., Starbucks®) is located near an intersection, and for all vehicles that stop at the intersection, the merchant transmits to the entertainment device in the vehicle advertisements to visit the merchant while the vehicle is stopped at the traffic light. In some embodiments, the vehicle status data includes one or more of velocity, acceleration, altitude, direction, or angular velocity of the vehicle.

In some embodiments of the present disclosure, determining whether the geographical location of the intersection is associated with the content item may include accessing a database of content items mapped to geographical locations. In some embodiments, the system may identify the content item with geographical origin metadata that matches the threshold distance of the intersection. For example, merchants within a threshold distance of an intersection transmit advertisements to a database for sorting and disseminating to vehicles within a threshold distance of an intersection.

In some embodiments, the system causes the presentation of the content item via the entertainment device of the vehicle by identifying an insertion point based on an estimated time for the vehicle to remain within the threshold distance of the intersection. Based on identifying the insertion point, the system inserts the content item for presentation at the insertion point. For example, based on identifying that the vehicle will be at the intersection from the first-time point for an estimated length of time (e.g., two minutes), the system transmits the advertisement to the playlist for presentation to coincide with the vehicle being present at the intersection. In some embodiments, the system may present the content item while the vehicle remains located within the threshold distance of the intersection. The threshold distance may be a default distance of the intersection, for example, 500 feet from the intersection, or may be a selected value by the merchant or the user. Based on providing the content item to the vehicle occupants while the vehicle is stopped or nearly stopped, the occupants may more be focused on the content items in the entertainment system.

In some embodiments, the system determines the estimated time for the vehicle to remain located within the threshold distance of the intersection by accessing a traffic map along the predicted path. The system then calculates a time between arrival and departure from the intersection based on a traffic map. Based on this time difference, the system may estimate that the vehicle will remain approximately the calculated time at the intersection. For example, based on google maps, it may be calculated that the typical vehicle remains at the intersection for two minutes. In some embodiments, the content item is presented for the duration of the estimated time the vehicle remains located within the threshold distance of the intersection. For example, while the vehicle is waiting at the traffic light, the content item is dynamically inserted into the playlist to allow the occupants to focus more on the content item.

In some embodiments, the system accesses information in a user profile, such as preferred genres, preferred media assets, preferred merchants or preferred actors. A variety of other information may also be used to select content items for display, such as environmental conditions or locale information. In some embodiments, the system may identify content items for insertion into the playlist of an entertainment device associated with the vehicle based on the user profiles of occupants and the predicted path of the vehicle.

In some embodiments, the system determines whether the geographical location of the intersection is associated with the content item by considering the content item based on user preferences associated with the user profile. In some embodiments, a content item database is generated with each content item in the database associated with a geographical location and an intersection. Based on a predicted path of a vehicle, an intersection is identified and the content items associated with that intersection may be selected for presentation. In some embodiments, the content item may be an advertisement for a merchant within the threshold distance of the intersection. In another embodiment, the content item may be an advertisement for a merchant along the predicted path. For example, an advertisement for a baseball game may be presented when the predicted path of the vehicle travels near the baseball stadium. Such an advertisement may be presented at multiple intersections along the path to increase user engagement.

In some embodiments, the system may determine an environmental condition based on information collected from one or more systems of the vehicle. The environmental conditions may include weather information (e.g., sunny, rainy, snowy, etc.), road information (e.g., potholes recorded in a database, road speed limit, road traction, etc.) or traffic information (car accidents, construction delays, traffic delays), as well as historical statistics for a road. Vehicle status data may be provided based on the collected vehicle data, and a predicted path may be identified based on the vehicle status data. Content items from a merchant may be provided for display on the entertainment device based on the vehicle's proximity to an intersection along the predicted path or near the predicted path.

In some embodiments, predicting the path of the vehicle (e.g., route from geographical location to destination) includes receiving a geographical location of the vehicle and a selection of a destination of the vehicle. Based on the geographical location and destination of the vehicle, the system may determine the predicted path of the vehicle. Further, in some embodiments, the system may identify a geographical location of the content items proximate to the predicted path, or the system may search for and identify content items with metadata that match the identified intersections with geographical locations along the predicted path. For example, as the vehicle approaches an intersection, the system may search for advertisements describing businesses along the predicted path of the vehicle from local radio stations. In some embodiments, the advertisements describing businesses along the predicted path of the vehicle may be pushed out to the vehicle via an internet-connected vehicle.

The vehicle status data that is acquired from the vehicle may represent a variety of types of information, such as velocity, acceleration, altitude, direction, or angular velocity. This and other vehicle status data may be used to determine the predicted path, such as whether the vehicle is or will be turning, rising, falling, accelerating, or decelerating at certain points along the predicted path based on intersections. In some embodiments, those additional outputs may be controlled based on information from the vehicle, such as the vehicle status data or predicted path. In some embodiments, the vehicle is autonomous or semi-autonomous, capable of sensing its environment and moving the auto safely with little or no human input. Based on engaging such an autonomous or semi-autonomous mode in a vehicle, the system may dynamically cause the presentation of a content item while driving in such a mode.

In some embodiments, a predicted path of the vehicle may be determined, for example, based on the vehicle status data and geographical location data for the vehicle. This information may be used to identify a predicted path for the vehicle, and based on the predicted path, additional content items corresponding to merchants along the predicted path may be identified. These additional content items may be compared with the user's historical engagement to identify content items to be provided to the entertainment device of the vehicle. The predicted path may be updated continuously or periodically, for example, based on changed vehicle status data or changes in the predicted path. In some embodiments, as a result of a change in path, the dynamic playlist may be updated based on the change to include new content items along the new predicted path.

A playlist may be dynamically modified, based on the vehicle's predicted path, for example, by inserting appropriate content items into the playlist that correspond to intersections and the surrounding merchants. For example, the playlist may include particular points within the playlist where it is appropriate to insert content items, such as while the vehicle is approaching, is within a threshold distance of, or is exiting the threshold distance of the intersection. An insertion point may be identified. The content item that corresponds to the intersection and surrounding merchants may be presented at the insertion point via an entertainment device of the vehicle.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

The present disclosure is related to providing dynamic in-vehicle content based on driving and navigation data. An exemplary user equipment device may be capable of displaying a variety of content types, such as standard video content, audio or a combination of both. The user equipment may include a display and in some embodiments may include a variety of other outputs that provide information to a user, such as a variety of audio and haptic outputs. In some embodiments, the user equipment may respond to movements of a vehicle along a predicted path, such as approaching an intersection with a red light signal, approaching heavy traffic, or any such movements where the vehicle slows down or stops for a moment. In response to identifying such intersections or other locations, the user equipment may search for content items associated with merchants in proximity to the intersection (e.g., within a threshold distance of the intersection). Based on identifying a content item, the entertainment device of the vehicle may present the content item while the vehicle is in proximity to the intersection.

In some embodiments, the user equipment may respond to movements of a user, such as head movements, eye movements, hand motions, other suitable user movements, and patterns of any such movements. The response may modify the content presented on the entertainment device of the vehicle, such as by presenting a content item on the entertainment device of the vehicle associated with a merchant within a threshold distance of the vehicle.

Vehicles have a variety of systems that capture information about virtually all aspects of vehicle operation, and increasingly, exterior and environmental conditions. For example, vehicle sensors may collect information about velocity, acceleration, altitude, roll, internal temperature, external temperature, braking, humidity, rain, snow, fog, cloud cover, wind, light, adjacent items or structures, etc. Such sensors are used to measure certain parameters directly and, in many instances, can be combined to calculate a variety of other parameters. Patterns may be discerned from these measures and calculations, such as driver acceleration and braking patterns, weather patterns, traffic patterns and intersections along a predicted path. Any such information (e.g., measured, calculated, or pattern data) may correspond to vehicle status data.

The vehicle status data may be analyzed to determine a predicted path by computing systems of the vehicle, electronics modules of the vehicle, the user equipment, other computing devices in the vehicle, or any suitable combination thereof. In some embodiments, additional information from other sources such as the user equipment or a network connection (e.g., a wireless network connection of a vehicle or user equipment) may also be used to determine the vehicle motion profile. For example, location information, traffic information, weather information, navigation routes, and other relevant information may be provided via a network connection. In some embodiments, multiple predicted paths may be determined for a trip, for example, based on a route being navigated or a predicted path. The multiple predicted paths may be combined into a composite vehicle predicted path that may be used to preemptively identify content items within a threshold distance of the intersection along the predicted path. The composite predicted paths might be updated based on changes in the vehicle status data, route, other additional information, or a suitable combination thereof.

Figure 1:
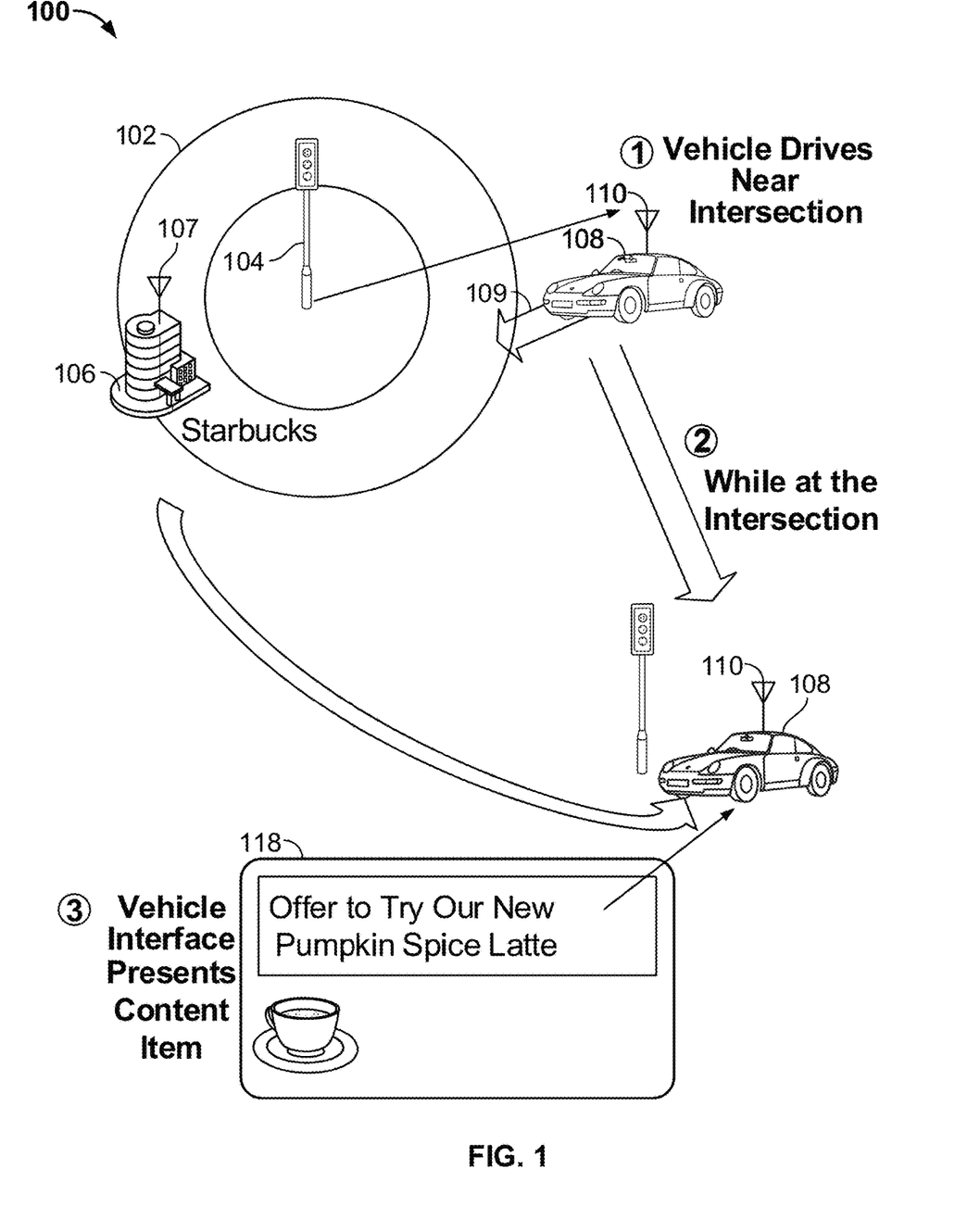
FIG. 1 shows an illustrative example of a system for providing dynamic in-vehicle content based on upcoming intersections, in accordance with some embodiments of the disclosure.

FIG. 1 shows an illustrative example of a system for providing dynamic in-vehicle content based on upcoming intersections, in accordance with some embodiments of the disclosure. As depicted in FIG. 1, a system 100 may include a vehicle such as vehicle 108 traveling on a predicted path such as roadway 109. Although the embodiments described herein may be discussed in the context of a vehicle traveling on a roadway, it will be understood the present disclosure may apply to any suitable vehicle (e.g., car, motorcycle, scooter, cart, truck, bus, boat, train, street car, subway, airplane, personal aircraft, drone, etc.) and no vehicle at all, traveling along any suitable predicted path (e.g., roadway, path, waterway, flight path, etc.).

The system 100 may also include environmental conditions for the area and locale information for intersections 104 (e.g., stops along the path). Environmental conditions may include conditions external to the vehicle such as current weather conditions (e.g., temperature, precipitation, pressure, fog, cloud cover, wind, sunlight, etc.) and locale information may include information about a locale such as the presence of buildings, other vehicles, topography, waterways, trees, other plant life, pedestrians, animals, businesses, and a variety of other information that may be identified or observed from a vehicle (e.g., via systems of a vehicle) or provided to the vehicle or a user equipment device in a vehicle, (e.g., via intra-vehicle communications or local communications networks). In the exemplary embodiment of FIG. 1, the environmental conditions 111 may include cloudy conditions and the locale may be a city.

In some embodiments, the vehicle may be autonomous or semi-autonomous, a vehicle capable of sensing its environment and moving safely with little or no human input. The vehicle may be network-connected, a vehicle that can communicate bi-directionally with other systems outside of the vehicle.

The vehicle may communicate bi-directionally via the vehicle antenna array 110 with the merchant system 107 to facilitate and transmit content items for presentation to the entertainment device of the vehicle based on being within a threshold distance 102 of an intersection 104. Each vehicle 108 having a vehicle antenna 110 and a vehicle interface 118 receives and sends signals (e.g., transmitting the vehicle's location). The merchant antenna 107 can receive and send information to and from vehicle system 108, or cloud-based servers, to provide the content item for an entertainment device of the vehicle based on the geographical location of the vehicle 108 being within a threshold distance 102 of an intersection 104. Vehicle antenna 110 can be, e.g., a shark fin antenna array or a flat antenna array formed on a roof of a vehicle. Each intersection 104 is a point along the predicted path of the vehicle where the vehicle will need to stop or nearly stop for a period of time.

In some embodiments, upon identifying a vehicle along the predicted path arriving (e.g., within a threshold distance of the intersection) near an intersection 104 and decreasing speed, i.e., that the vehicle is likely approaching a red light or traffic, the system determines whether a geographical location of the intersection is associated with a content item. For example, are there any merchants associated with the intersection? In some instances, a coffee shop (e.g., Starbucks) coming up on the road may have advertisements associated with this intersection. In another example, a sports stadium may have promotions associated with a nearby intersection to better engage with the occupants of a vehicle driving near it.

In some embodiments, upon identifying a geographical location of the intersection is associated with a content item, the system causes the presentation of the content item via an entertainment device of the vehicle. For example, the system causes the advertisement for the coffee shop to be presented on the device 118 in the vehicle. In some embodiments, the device 118 that presents the content item may be associated with the vehicle, for example, an interactive entertainment device attached to the vehicle. In other embodiments, the device that presents the content item may be within the vehicle, for example, a mobile phone. In yet other embodiments, the device that presents the content item may be the device providing navigation to the vehicle through the predicted path. In yet another aspect of this embodiment, the device that presents the content item may be a second device different from the device providing navigation to the vehicle through the predicted path. In the illustrative example, while vehicle 108 remains at intersection 104, a content item 118 (e.g., promotion for the coffee merchant to "Offer to Try our New Pumpkin Spice Latte") is presented on the entertainment device.

Figure 2:
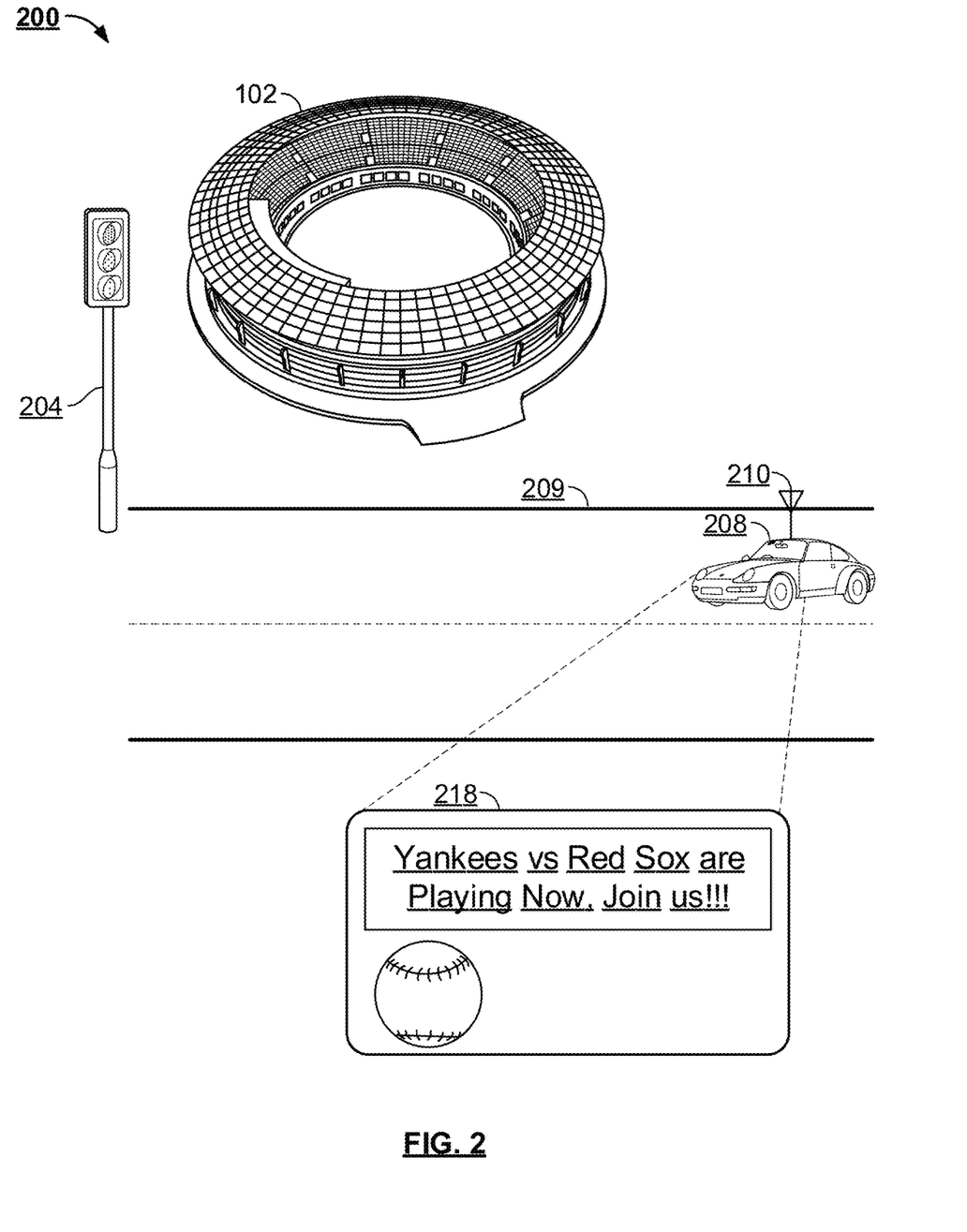
FIG. 2 shows another example of a system for providing dynamic in-vehicle content based on the predicted path of the vehicle, in accordance with some embodiments of the disclosure.

FIG. 2 shows another example of a system for providing dynamic in-vehicle content based on the predicted path of the vehicle, in accordance with some embodiments of the disclosure. As depicted in FIG. 2, a system 200 may include a vehicle such as vehicle 208 traveling on a predicted path such as roadway 209. Although the embodiments described herein may be discussed in the context of a vehicle traveling on a roadway, it will be understood the present disclosure may apply to any suitable vehicle (e.g., car, motorcycle, scooter, cart, truck, bus, boat, train, street car, subway, airplane, personal aircraft, drone, etc.) and no vehicle at all, traveling along any suitable predicted path (e.g., roadway, path, waterway, flight path, etc.).

In some embodiments, upon identifying a vehicle along the predicted path arriving (e.g., within a threshold distance of the intersection) near an intersection 204 and decreasing speed, i.e., that the vehicle is likely approaching a red light or traffic, the system determines whether a geographical location of the intersection is associated with a content item. For example, driving near a sporting stadium 202, the stadium may have promotions associated with the intersection near the stadium to better engage with the occupants of a vehicle traveling near the stadium. The threshold distance of the intersection may be preselected by the merchant, in this case, a stadium. For example, the distance may be a couple of miles from the stadium, with a number of intersections including content items associated with them.

In some embodiments, upon identifying that a geographical location of the intersection is associated with a content item, the system causes the presentation of the content item via an entertainment device of the vehicle. For example, the system causes the advertisement for the baseball game to be presented on the device 218 in the vehicle. In some embodiments, the device 218 that presents the content item may be associated with the vehicle, for example, an interactive entertainment device attached to the vehicle. In some embodiments, the device that presents the content item may be within the vehicle, for example, a mobile phone. In some embodiments, the device that presents the content item may be the device providing navigation to the vehicle through the predicted path. In some embodiments, the device that presents the content item may be a second device different from the device providing navigation to the vehicle through the predicted path. In the illustrative example, while vehicle 208 remains at intersection 204, a content item 218 (e.g., promotion for the baseball game, "Yankees vs. Red Sox are playing now, join us!!!") is presented on the entertainment device.

Figure 3:
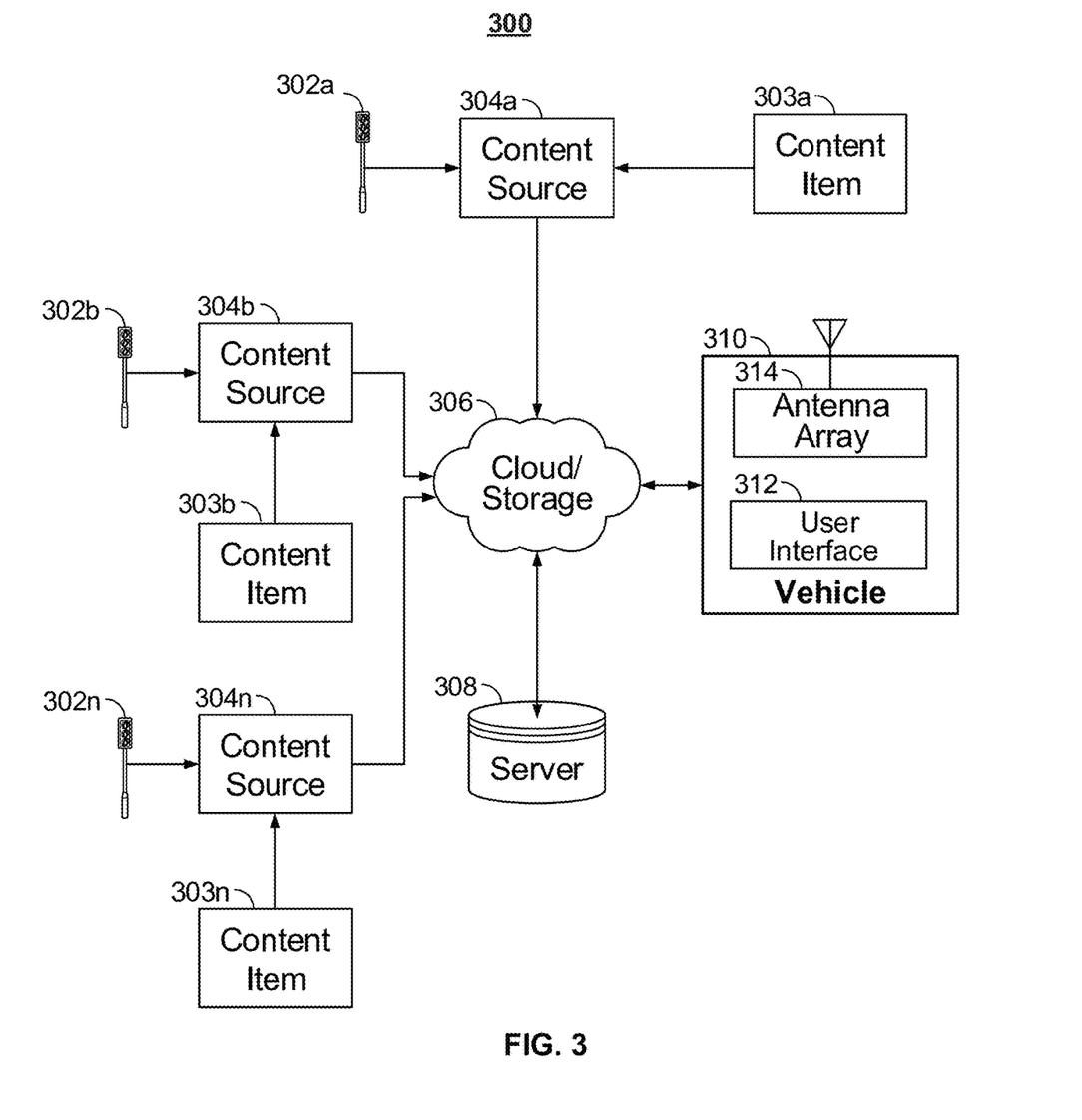
FIG. 3 depicts exemplary systems, servers and related hardware for providing dynamic in-vehicle content based on the predicted path of the vehicle and the merchants within a threshold distance of an intersection, in accordance with some embodiments of the disclosure.

FIG. 3 depicts exemplary systems, servers and related hardware for providing dynamic in-vehicle content based on the predicted path of the vehicle and the merchants within a threshold distance of an intersection, in accordance with some embodiments of the disclosure. FIG. 3 shows a generalized embodiment of an illustrative system 300 in which user equipment device 118 of FIG. 1 and the system 100 of FIG. 1 can be implemented. System 100 includes an array of intersections (e.g., 302a, 302b, 302c, 302d . . . 302n) associated with content sources (e.g., 304a, 304b, 304c, 304d . . . 304n) with each content source being associated with a content item (e.g., 303a, 303b, 303c, 303d . . . 303n). The content sources (e.g., 304a, 304b, 304c, 304d . . . 304n) may be coupled to storage device 306, server 308 and a vehicle 310. The vehicle 310 can communicate bidirectionally with other systems outside of the vehicle. Communications with the content sources (e.g., 304a, 304b, 304c, 304d . . . 304n) and storage device 306 may be exchanged over one or more communications paths but are shown as a single path in FIG. 3 to avoid overcomplicating the drawing.

The array of intersections (e.g., 302a, 302b, 302c, 302d . . . 302n) may include a plurality of intersections dispersed around the country associated with merchants in close proximity to the content sources (e.g., 304a, 304b, 304c, 304d . . . 304n). The intersections 302 may be coupled to content sources (e.g., 304a, 304b, 304c, 304d . . . 304n) that associate content items (e.g., 303a, 303b, 303c, 303d . . . 303n) with content sources (e.g., 304a, 304b, 304c, 304d . . . 304n) and deliver them to the storage device 306. The content items are connected to the server 308 for processing for content item recognition and geographical origin determination. The content items are processed through an automated content recognition. The automated content recognition can store, allocate based on content recognition and process for the presentation of the content items. The server 308 may be a collection of servers connected to the storage device for improved processing. The vehicle includes a user interface 312 and an antenna 314 that communicate with the storage device 306. All of the communication between the antennas, collectors, servers and vehicle may be through one or more networks including the Internet, a mobile phone network, mobile voice or data network (e.g., a 4G, 5G or LTE network), or other types of communications network or combinations of communications networks for in-vehicle use.

Figure 4:
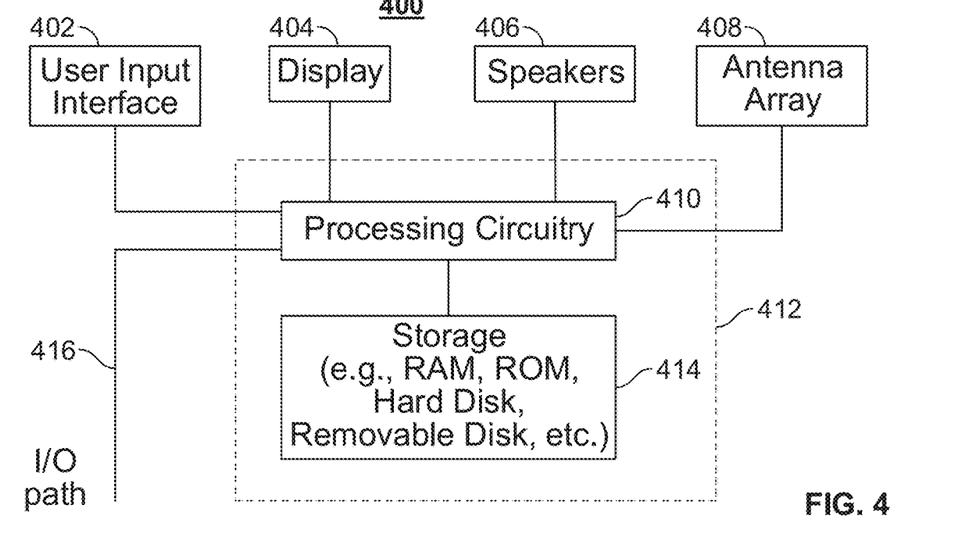
FIG. 4 depicts exemplary devices and related hardware for providing dynamic in-vehicle content based on the predicted path of the vehicle, in accordance with some embodiments of the disclosure.

FIG. 4 depicts exemplary devices and related hardware for providing dynamic in-vehicle content based on the predicted path of the vehicle, in accordance with some embodiments of the disclosure. A user or occupant in a vehicle may access content and the vehicle content interface application (and its display screens described above and below) from one or more of their user equipment devices. FIG. 4 shows a generalized embodiment of illustrative user equipment device 400. More specific implementations of user equipment devices are discussed above in connection with FIG. 3. User equipment device 400 may receive content and data via input/output (I/O) path 416. I/O path 416 may provide content (e.g., broadcast programming, on-demand programming, Internet content, content available over a local area network (LAN) or wide area network (WAN), and/or other content) and data to control circuitry 412, which includes processing circuitry 410 and storage 414. Control circuitry 412 may be used to send and receive commands, requests, and other suitable data using I/O path 416.

Control circuitry 412 may be based on any suitable processing circuitry such as processing circuitry 410. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units. In some embodiments, control circuitry 412 executes instructions for a vehicle content interface application stored in memory (i.e., storage 414). Specifically, control circuitry 412 may be instructed by the vehicle content interface application to perform the functions discussed above and below. For example, the vehicle content interface application may provide instructions to control circuitry 412 to generate the audio content display. In some implementations, any action performed by control circuitry 412 may be based on instructions received from the vehicle content interface application.

In client/server-based embodiments, control circuitry 412 may include communications circuitry suitable for communicating with a content application server or other networks or servers. The instructions for carrying out the above-mentioned functionality may be stored on the content application server. Communications circuitry may include a cable modem, an integrated-services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which are described in more detail in connection with FIG. 5). In some embodiments, an antenna 408 is provided in the user equipment device 400. The antenna 408 may be used for communication with the network of antennas. In addition, communications circuitry may include circuitry that enables peer-to-peer communication of user equipment devices, or communication of user equipment devices in locations remote from each other (described in more detail below).

Memory may be an electronic storage device provided as storage 414 that is part of control circuitry 412. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 414 may be used to store various types of content described herein as well as content data and content application data that are described above. Nonvolatile memory may also be used (e.g., to launch a boot-up routine and other instructions). Cloud-based storage may be used to supplement storage 414 or instead of storage 414.

Control circuitry 412 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 412 may also include scaler circuitry for upconverting and down-converting content into the preferred output format of the user equipment device 400. Control Circuitry 412 may also include digital-to-analog converter circuitry and analog-to-digital converter circuitry for converting between digital and analog signals. The tuning and encoding circuitry may be used by the user equipment device to receive and to display, play, or record content. In some embodiments, the control circuitry may include an HD antenna.

In one embodiment, speakers 406 may be provided as integrated with other elements of user equipment device 400 or may be stand-alone units. The audio and other content displayed on display 404 may be played through speakers 406. In some embodiments, the audio may be distributed to a receiver (not shown), which processes and outputs the audio via speakers 406.

In some embodiments, a sensor (not shown) is provided in the user equipment device 400. The sensor may be used to monitor, identify, and determine vehicle status data. For example, the vehicle content interface application may receive vehicle status data from the sensor or any other vehicle status data (e.g., global positioning data of the vehicle, driving condition of the vehicle, etc.) received from any other vehicular circuitry and/or component that describes the status of the vehicle.

The vehicle content interface application may be implemented using any suitable architecture. For example, it may be a stand-alone application wholly implemented on user equipment device 400. In such an approach, instructions of the application are stored locally (e.g., in storage 414), and data for use by the application is downloaded on a periodic basis (e.g., from an out-of-band feed, from an Internet resource, or using another suitable approach). Control circuitry 412 may retrieve instructions of the application from storage 414 and process the instructions to generate any of the displays discussed herein. Based on the processed instructions, control circuitry 412 may determine what action to perform when input is received from input interface 402. For example, the movement of a cursor on an audio user interface element may be indicated by the processed instructions when input interface 402 indicates that a user interface 118 was selected.

In some embodiments, the vehicle content interface application is a client/server-based application. Data for use by a thick or thin client implemented on user equipment device 400 is retrieved on-demand by issuing requests to a server remote to the user equipment device 400. In one example of a client/server-based content application, control circuitry 412 runs a web browser that interprets web pages provided by a remote server. For example, the remote server may store the instructions for the application in a storage device. The remote server may process the stored instructions using circuitry (e.g., control circuitry 412) and generate the displays discussed above and below. The client device may receive the displays generated by the remote server and may display the content of the displays locally on user equipment device 400. This way, the processing of the instructions is performed remotely by the server while the resulting displays are provided locally on user equipment device 400. User equipment device 400 may receive inputs from the user or occupant of the vehicle via input interface 402 and transmit those inputs to the remote server for processing and generating the corresponding displays. For example, user equipment device 400 may transmit, via antenna 408, communication to the remote server, indicating that a user interface element was selected via input interface 402. The remote server may process instructions in accordance with that input and generate a display of content identifiers associated with the selected user interface element as described in greater detail with reference to FIGS. 6 and 7. The generated display is then transmitted to user equipment device 400 for presentation to the user or occupant of the vehicle.

In some embodiments, the vehicle content interface application is downloaded and interpreted or otherwise run by an interpreter or virtual machine (run by control circuitry 412). In some embodiments, the vehicle content interface application may be encoded in the ETV Binary Interchange Format (EBIF), received by control circuitry 412 as part of a suitable feed, and interpreted by a user agent running on control circuitry 412. For example, the vehicle content interface application may be an EBIF application. In some embodiments, the vehicle content interface application may be defined by a series of JAVA-based files that are received and run by a local virtual machine or other suitable middleware executed by control circuitry 412. In some of such embodiments (e.g., those employing MPEG-2 or other digital media encoding schemes), the vehicle content interface application may be, for example, encoded and transmitted in an MPEG-2 object carousel with the MPEG audio of a program.

Figure 5:
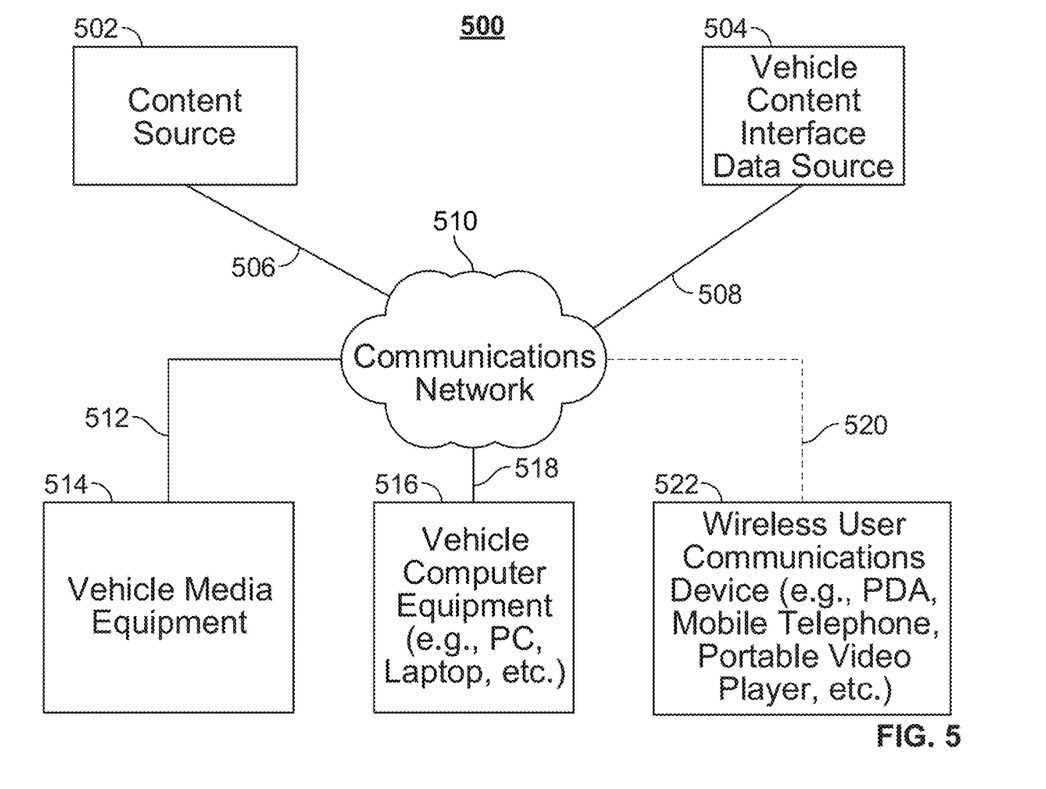
FIG. 5 depicts exemplary systems, servers and related hardware for providing dynamic in-vehicle content based on the predicted path of the vehicle, in accordance with some embodiments of the disclosure.

User equipment device 400 of FIG. 4 can be implemented in system 500 of FIG. 5 as vehicle media equipment 514, vehicle computer equipment 518, wireless user communications device 522 or any other type of user equipment suitable for accessing content, such as a non-portable gaming machine. For simplicity, these devices may be referred to herein collectively as user equipment or user equipment devices and may be substantially similar to user equipment devices described above. User equipment devices, on which a vehicle content interface application may be implemented, may function as stand-alone devices or may be part of a network of devices. Various network configurations of devices may be implemented and are discussed in more detail below.

FIG. 5 depicts exemplary systems, servers and related hardware for providing dynamic in-vehicle content based on the predicted path of the vehicle, in accordance with some embodiments of the disclosure. A user equipment device utilizing at least some of the system features described above in connection with FIG. 5 may not be classified solely as vehicle media equipment 514, vehicle computer equipment 516, or a wireless user communications device 522. For example, vehicle media equipment 514 may, like some vehicle computer equipment 516, be Internet-enabled, allowing for access to Internet content, while wireless user computer equipment 522 may, like some vehicle media equipment 514, include a tuner allowing for access to media programming. The vehicle content interface application may have the same layout on various types of user equipment or may be tailored to the display capabilities of the user equipment. For example, on wireless user computer equipment 516, the vehicle content interface application may be provided as a website accessed by a web browser. In another example, the vehicle content interface application may be scaled down for wireless user communications devices 522.

The user equipment devices may be coupled to communications network 510. Communications network 510 may be one or more networks including the Internet, a mobile phone network, mobile voice or data network (e.g., a 4G, 5G or LTE network), cable network, public switched telephone network, or other types of communications network or combinations of communications networks.

System 500 includes content source 502 and vehicle content interface data source 504 coupled to communications network 510. Communications with the content source 502 and the data source 504 may be exchanged over one or more communications paths but are shown as a single path in FIG. 5 to avoid overcomplicating the drawing. Although communications between sources 502 and 504 with user equipment devices 514, 516, and 522 are shown through communications network 510, in some embodiments, sources 502 and 504 may communicate directly with user equipment devices 514, 516, and 522.

Content source 502 may include one or more types of content distribution equipment including a media distribution facility, satellite distribution facility, programming sources, intermediate distribution facilities and/or servers, Internet providers, on-demand media servers, and other content providers. Vehicle content interface data source 504 may provide content data, such as the audio described above. Vehicle content interface application data may be provided to the user equipment devices using any suitable approach. In some embodiments, vehicle content interface data from vehicle content interface data source 504 may be provided to users' equipment using a client/server approach. For example, a user equipment device may pull content data from a server, or a server may present the content data to a user equipment device. Data source 504 may provide user equipment devices 514, 516 and 522 the vehicle content interface application itself or software updates for the vehicle content interface application.

Figure 6:
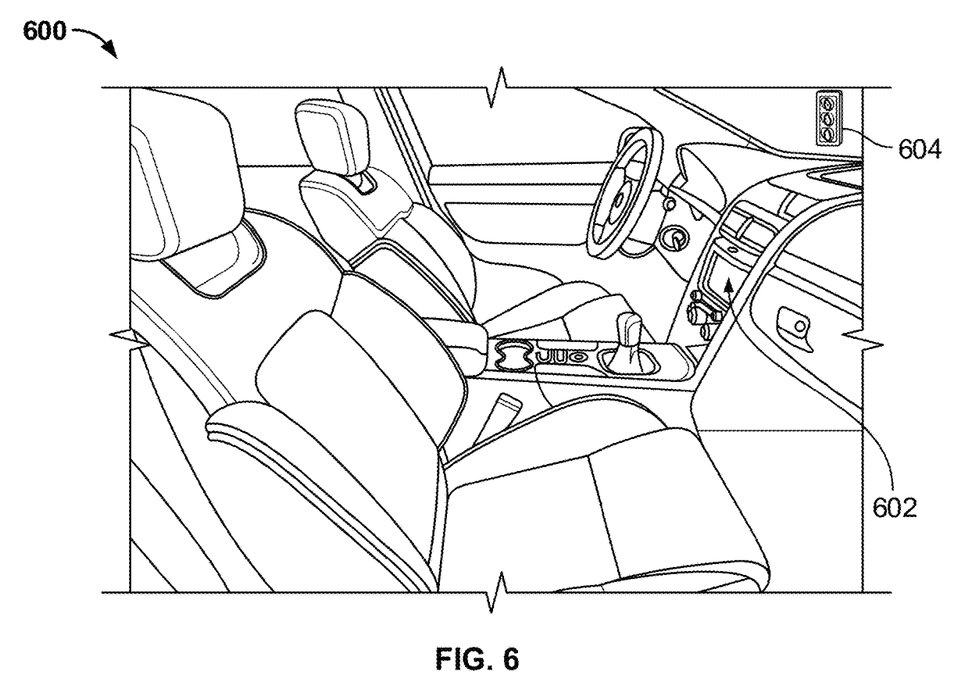
FIG. 6 depicts an illustrative example of a vehicle featuring a content display for providing dynamic in-vehicle content, in accordance with some embodiments of the present disclosure.

FIG. 6 depicts an illustrative example of a vehicle featuring a content display for providing dynamic in-vehicle content, in accordance with some embodiments of the present disclosure. In one embodiment, user equipment may refer to components incorporated into, coupled to, or accessible by a vehicle such as vehicle 600 in FIG. 6. The vehicle 600 is equipped with a vehicle content interface application that may be used to enable/disable content options. For example, an occupant in vehicle 600 may use vehicle content interface component 602 to access content in the vehicle 600. In some embodiments, the vehicle content interface component 602 may be an audio system incorporated into vehicle 600 or user equipment used to access such content while using vehicle 600. Further, as depicted in FIG. 6, the vehicle content interface component 602 may present content in response to the vehicle being within a threshold distance of the intersection 604.

Figure 7:
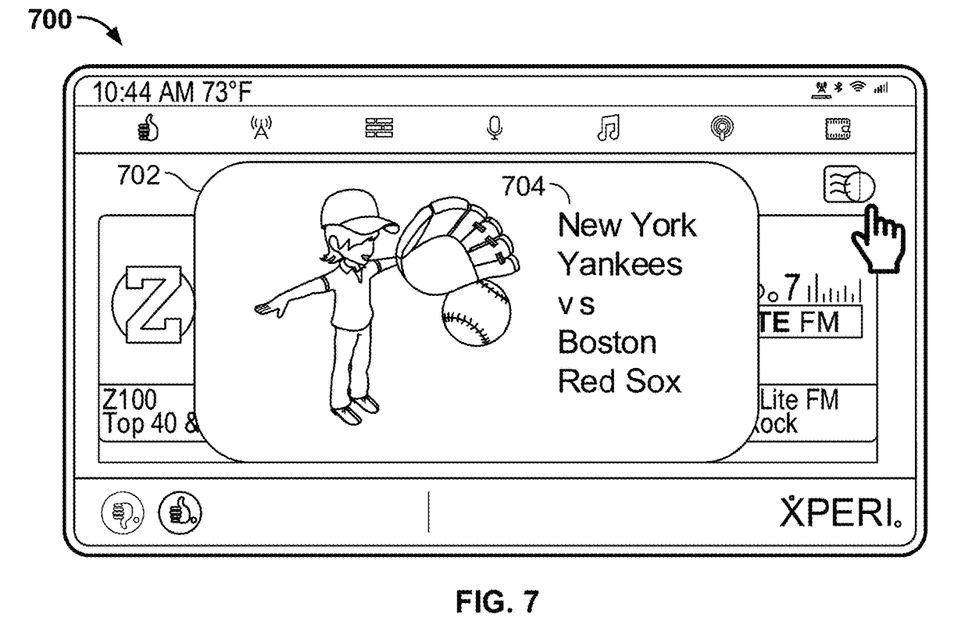
FIG. 7 depicts an illustrative example of an in-vehicle content interface application for dynamic in-vehicle content, in accordance with some embodiments of the present disclosure.

FIG. 7 depicts an illustrative example of an in-vehicle content interface application for dynamic in-vehicle content, in accordance with some embodiments of the present disclosure. As discussed above, in some embodiments, a user or occupant of the vehicle 600 may select the user interface 700 via a user interface 118 (FIG. 1) and 218 (FIG. 2) incorporated into or accompanying the vehicle content interface component 702. The vehicle content interface component 702 may be inserted into the user interface 700 in response to the vehicle being within a threshold distance of the intersection 604. Upon determining that the vehicle is within a threshold distance of the intersection 604, the user interface 118 may display a content item 702 with a promotion 704 "New York Yankees vs Boston Red Sox" on the display screen 700 as shown in FIG. 7. For the duration of the user or occupant of the vehicle remaining within a threshold distance of the intersection 604, one of the content items is presented via the user interface (e.g., vehicle entertainment device 700 (FIG. 7) incorporated into or accompanying the vehicle.

As discussed above, in some embodiments, to provide dynamic in-vehicle content, a user interface 118 is displayed on the screen of the vehicle content interface component 702. In one example, an occupant in the vehicle 600 may provide an instruction for a destination, resulting in the system generating a predicted path incorporated into or accompanying the vehicle content interface component 702 by direct input into the user interface. Upon the user's selection of the destination, predicted paths may be displayed on the display screen 700 along with merchants (e.g., content sources) associated with intersections along the predicted paths. When the user selects one of the predicted paths via the user interface (e.g., user input interface 118 (FIG. 1)) incorporated into or accompanying the vehicle content interface component 702, the selected predicted path may include identifiers that correspond to the content type displayed on the screen. For example, the user selects a predicted path and, as the user drives along the predicted path, is prompted with an advertisement upon entering a threshold distance of an intersection. The content items may include information about content type and the geographical origin corresponding to each other. In some embodiments, the content items presented on display may provide a selectable option to navigate to the content source.

Figure 8:
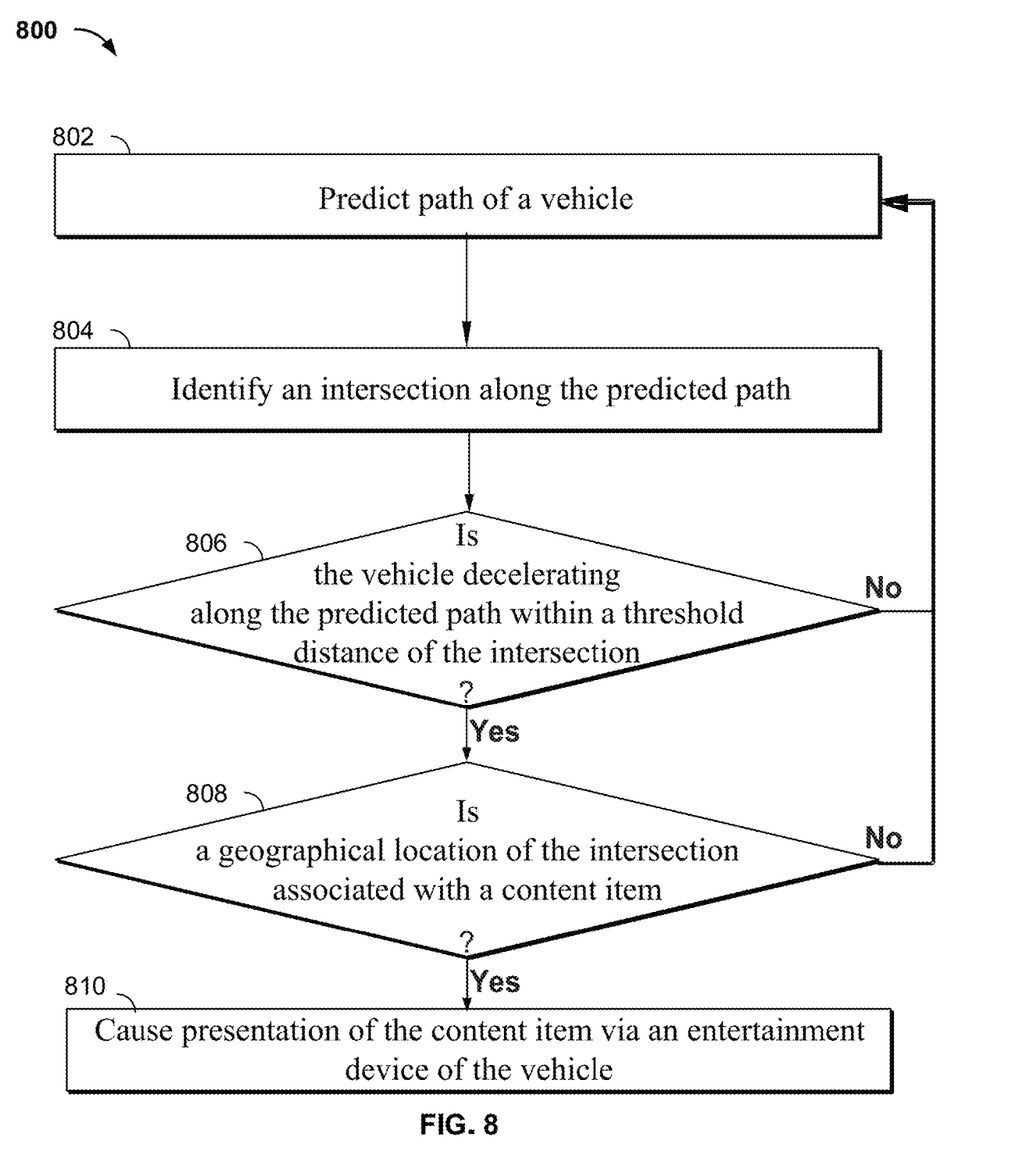
FIG. 8 is a flowchart of a detailed illustrative process for providing dynamic in-vehicle content based on the predicted path of the vehicle, in accordance with some embodiments of the disclosure.

FIG. 8 is a flowchart of a detailed illustrative process for providing dynamic in-vehicle content based on the predicted path of the vehicle, in accordance with some embodiments of the disclosure. As shown in FIG. 8, in accordance with some embodiments, a process 800 may be executed by processing circuitry 400 of a vehicle (FIG. 4). It should be noted that process 800 or any step thereof could be performed on, or provided by, the system of FIGS. 4 and 5 or any of the devices shown in FIGS. 1, 2, 6 and 7. In addition, one or more of process 800 may be incorporated into or combined with one or more other steps described herein (e.g., incorporated into steps of process 900). For example, process 800 may be executed by control circuitry 412 (FIG. 4) as instructed by a vehicle content interface application implemented on a user device in order to present a content item based on the vehicle being within a threshold distance of an intersection location based on vehicle's geographical location. Also, one or more steps of process 800 may be incorporated into or combined with one or more steps of any other process or embodiment.

At step 802, the system predicts the path of the vehicle. For example, the occupant of the vehicle has entered a destination, and, based on the geographical location, the system identifies a predicted path of the vehicle. In some embodiments, the vehicle's geographical location, the weather conditions, and the destination of the vehicle may be received and processed individually, or, in some embodiments, a set of environmental data may be identified for analysis based on criteria such as user preferences, for example, for the predicted path. In some embodiments, the system may access the metadata associated with the user's historical transactions. For example, every transaction the user makes is stored in a database including the location, time, date, type of order, restaurant and any other suitable information. The predicted path may be selected to travel along a merchant's location that the user has previously purchased content from based on the transaction history. In some embodiments, the predicted path may be any path traveled by the vehicle that may be altered.

At 804, the system identifies an intersection along the predicted path of the vehicle, for example, an intersection on the map that will likely result in the occupant of the vehicle stopping and result in availability to focus on some entertainment device. In some embodiments, the system may identify intersection points on the map that cause a slowdown for the vehicle. For example, the system searches for intersections that cause a delay (and, for example, occur at the same or similar time and include the same or similar route). In some embodiments, the intersections may be identified based on historical transactions including a time of the day and the day of the week.

At 806, the system determines whether the vehicle is decelerating along the predicted path within a threshold distance of the intersection. For example, as the vehicle approaches the intersection on the map, along the predicted path, the vehicle reduces speed. Based on sensors in the vehicle, the system may detect that the vehicle is slowing down. To determine that the vehicle is decelerating towards the location of the intersection, the system may evaluate the GPS coordinates for the vehicle, the user's mobile device or any other suitable device for tracking GPS and the motion of said devices. The threshold distance of the intersection may be preselected by the content source, or the vehicle or set as a default distance, (e.g., 500 feet or 1000 feet from the intersection). The threshold distance may be selected based on preference and/or based on the merchant. If the system determines that the vehicle is decelerating along the predicted path within a threshold distance of the intersection ("Yes" at 806), then, at 808, the system determines whether a geographical location of the intersection is associated with a content item. This occurs without the user's input. If, on the other hand, the system determines that the vehicle is not decelerating within a threshold distance of the intersection ("No" at 806), then 802 may be repeated.

At 808, the system determines whether a geographical location of the intersection is associated with a content item. For example, does a merchant (e.g., Starbuck) near the intersection on the map have an advertisement that would be suitable for presenting in a vehicle device. If the system determines that a geographical location of the intersection is associated with a content item ("Yes" at 808), then, at 810, the system causes presentation of the content item via an entertainment device of the vehicle. For example, an audio promotion for a business may play via the speakers in the vehicle. In another example, an audio promotion for a business may play via the display in the vehicle. This occurs without the user's input. If, on the other hand, the system determines that a geographical location of the intersection is not associated with a content item ("No" at 808), then 802 may be repeated.

Figure 9:
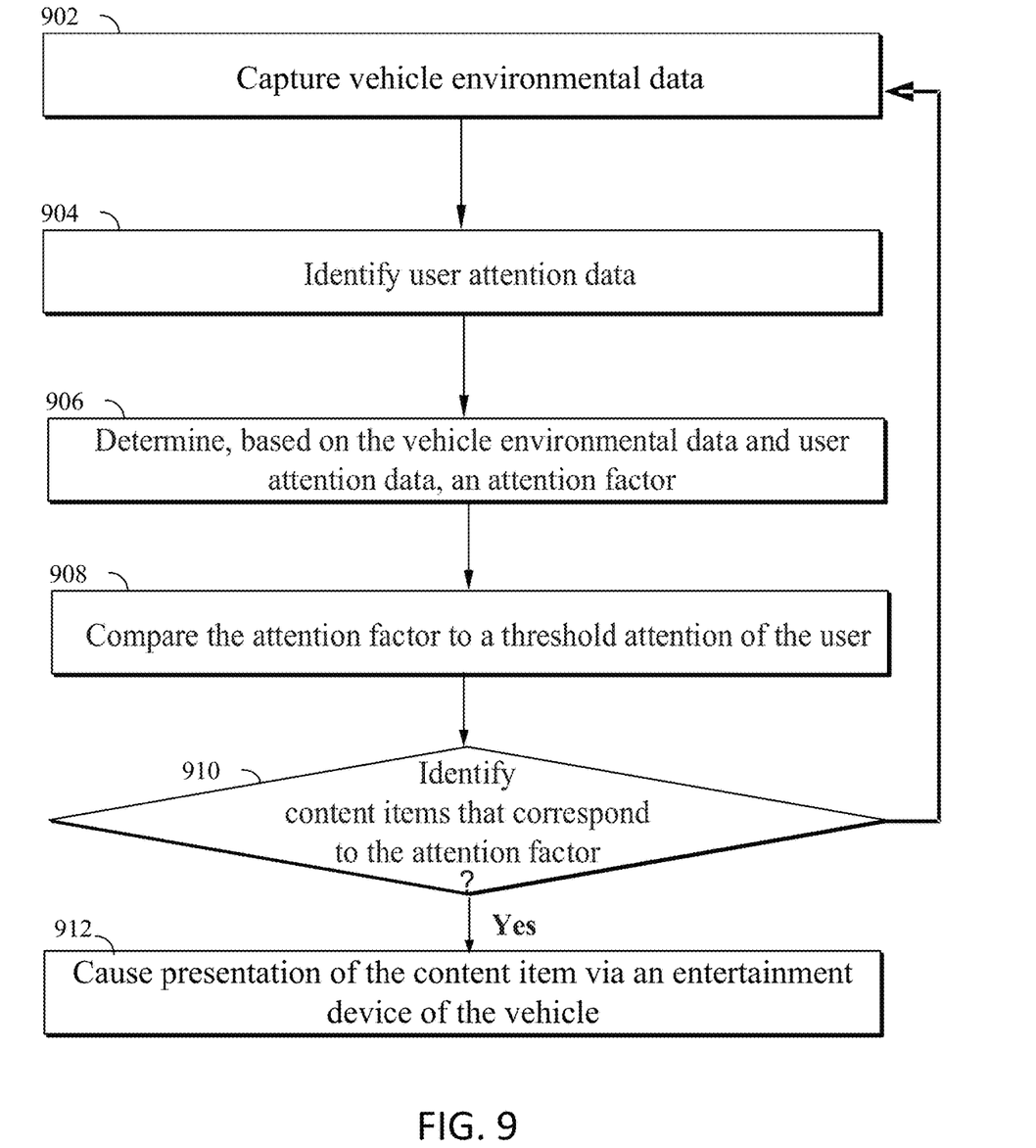
FIG. 9 is a flowchart of another detailed illustrative process for providing alternate dynamic in-vehicle content based on vehicle environment data and user data, in accordance with some embodiments of the disclosure.

FIG. 9 is a flowchart of another detailed illustrative process for providing alternate dynamic in-vehicle content based on vehicle environment data and user data, in accordance with some embodiments of the disclosure. As shown in FIG. 9, in accordance with some embodiments, a process 900 may be executed by processing circuitry 400 of a vehicle (FIG. 4). It should be noted that process 900 or any step thereof could be performed on, or provided by, the system of FIGS. 4 and 5 or any of the devices shown in FIGS. 1, 2, 6 and 7. In addition, one or more of process 900 may be incorporated into or combined with one or more other steps described herein (e.g., incorporated into steps of process 800). For example, process 900 may be executed by control circuitry 412 (FIG. 4) as instructed by a vehicle content interface application implemented on a user device in order to present a content item based on the vehicle being within a threshold distance of an intersection location based on the vehicle's geographical location. Also, one or more steps of process 900 may be incorporated into or combined with one or more steps of any other process or embodiment herein.

At step 902, the system captures vehicle environmental data for the vehicle. The system may capture the vehicle's geographical location, the traffic conditions, or the weather conditions; the destination of the vehicle may be received and processed individually, or, in some embodiments, a set of environmental data may be identified for analysis based on criteria such as user preferences, for example, for the predicted path. In some embodiments, the system may access the metadata associated with the user's historical transactions. For example, every transaction the user makes is stored in a database including the location, time, date, type of order, restaurant and any other suitable information.

At 904, the system identifies user attention data. The system may employ cameras and microphones in the vehicle along with the vehicle's data to identify the users or occupant's attention data, including monitoring biometric data from wearable sensors. Based on said user attention data the system may determine where they are able to focus on the entertainment devices in the vehicle. For example, the occupant's attention factors may consider the historical traffic data with in-vehicle sensors to identify the road conditions (e.g., potholes, number of people on sidewalks, number of cars, etc.), movements of a user, such as head movements, eye movements, hand motions, other suitable user movements, and patterns of any such movements.

At 906, the system determines, based on the vehicle environmental data and user attention data, a user attention factors. Such factors may be discerned from these measurement and calculations, such as driver acceleration and braking patterns, weather patterns, and traffic patterns. Any such information (e.g., measured, calculated, or pattern data) may correspond to vehicle status data.

In some embodiments, the attention factors may be determined based on the following correlation matrix for the driver, as shown in Table 1, and the occupants, as shown in Table 2 of the vehicle. For example, the driver parameters may include patience level determined based on a personality test for "Extroversion, Emotional Stability, Orderliness, Accommodations, and Intellect." Based on such a test, a factor may be applied to the attention of the user. The ad preferences for the driver parameters include advertisements that are musical, voiceovers, dialogs, specific products, etc. The audio preferences for the driver parameters include podcasts, songs of the genre, motivational, favorites, etc. In some embodiments, the correlation may further consider the analysis of pre-engagements based on calendars, etc., before the drive and mood analysis. Further, the road parameters may include drive smoothness, the density of traffic, pace of traffic, and historical road statistics. Based on the identified correlation factors for each of the identified criteria, the driver's attention factor may be determined. For example, a driver with a higher attention factor may receive content items via the entertainment device in certain circumstances, specifically driving with little traffic. On the other hand, a driver with a lower attention factor may receive content items only when stopped at a traffic light, as summarized in Table 1 and Table 2 below.

TABLE 1

| Correlation Matrix For Driver And Road Parameters | | | Correlation factor |
|---|---|---|---|
| Driver parameters | Patience level-personality diagnosis using any framework | Extroversion | 0.8 |
| | | Emotional stability | 0.65 |
| | | Orderliness | 0.50 |
| | | Accommodations | 0.35 |
| | | Intellect | 0.15 |
| | Ad preferences/ad personality for the driver | Musical | 0.8 |
| | | Voiceovers | 0.7 |
| | | Dialogs | 0.6 |
| | | Specific products | 0.5 |
| | Audio preferences | Podcasts | 0.8 |
| | | Songs of genre | 0.7 |
| | | Motivational | 0.6 |
| | | Favorites | 0.5 |
| | Analysis of pre-engagements based on calendars etc. Before the drive and mood analysis | | |
| Road parameters | Drive smoothness-good/bad roads | | |
| | Density of traffic, pace of traffic | | |
| | Road stats-need of driver skills | | |

In some embodiments, similar to the driver, the non-driving occupants of the vehicle not driving may have similar correlations to determine their attention factors. For example, the correlation may be based on occupants and road parameters. Based on the identified correlation factors for each of the identified criteria, the occupants' attention factors may be determined. For example, an occupant with a higher attention factor may receive content items from the entertainment device in certain circumstances, specifically while moving with little traffic. On the other hand, occupants with a lower attention factor may receive content items only when stopped at a traffic light, as summarized in Table 2.

TABLE 2

| Correlation Matrix For Occupants And Road Parameters | | | Correlation factor |
|---|---|---|---|
| Rear seat unit parameters | Audio preferences | Podcasts | 0.8 |
| | | Audio/video | 0.9 |
| | | Songs of genre | 0.6 |
| | | Motivational | 0.5 |
| | | Favorites | 0.4 |
| | Patience level-personality diagnosis using any framework | Extroversion | 0.9 |
| | | Emotional stability | 0.8 |
| | | Orderliness | 0.8 |
| | | Accommodations | 0.7 |
| | | Intellect | 0.6 |
| | Ad preferences/ad personality for the driver | Musical | 0.8 |
| | | Voiceovers | 0.8 |
| | | Dialogs | 0.8 |
| | | Specific products | 0.8 |
| Road parameters | Drive smoothness-good/bad roads | | |
| | Density of traffic, pace of traffic | | |

At 908, the system compares the attention factor for a driver or occupant of the vehicle to a threshold attention of the user. Such factors may be discerned from these measurement and calculation, such as driver acceleration and braking patterns, weather patterns, and traffic patterns. Any such information (e.g., measured, calculated, or pattern data) may correspond to vehicle status data. The threshold attention for each user or occupant may be based on a lookup table. In some embodiments, the threshold attention may be updated based on historical information (e.g., measured, calculated, or pattern data).

At 910, the system identifies content items that correspond to the attention factors. For example, some content items may require lower attention (e.g., audio promotion) versus content items that require higher attention (e.g., video promotion). If the system identifies content items that correspond to the attention factors ("Yes" at 910), then, at 912, the system causes presentation of the content item via an entertainment device of the vehicle. For example, an audio promotion for a business may play via the speakers in the vehicle. In another example, an audio promotion for a business may play via the display in the vehicle. This occurs without the user's input. If, on the other hand, the system does not identify content items that correspond to the attention factors ("No" at 910), then 902 may be repeated.

It is contemplated that the steps or descriptions of FIGS. 8-9 may be used with any other embodiment of this disclosure. In addition, the steps and descriptions are described in relation to FIGS. 8-9 may be done in alternative orders or in parallel to further the purposes of this disclosure. Any of these steps may also be skipped or omitted from the process. Furthermore, it should be noted that any of the devices or equipment discussed in relation to FIGS. 4-5 could be used to perform one or more of the steps in FIGS. 8-9

As used herein, "a vehicle content interface application" refers to a form of content through an interface that facilitates access to audio, music, news and podcast content on one or more display devices operating within the vehicle. In some embodiments, the vehicle content interface application may be provided as an online application (i.e., provided on a website), or as a stand-alone application on a server, user device, etc. The vehicle content interface application may also communicate with a vehicle antenna array or telematics array to receive content via a network. Various devices and platforms that may implement the vehicle content interface application are described in more detail below. In some embodiments, the vehicle content interface application and/or any instructions for performing any of the embodiments discussed herein may be encoded on computer-readable media. Computer-readable media includes any media capable of storing instructions and/or data. The computer-readable media may be transitory, including, but not limited to, propagating electrical or electromagnetic signals, or may be non-transitory, including, but not limited to, volatile and nonvolatile computer memory or storage devices such as a hard disk, floppy disk, USB drive, DVD, CD, media card, register memory, processor caches, random access memory (RAM), etc.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, webcasts, etc.), a collection of episodes in a series, a single episode in a series, video clips, audio, content information, pictures, rotating images, documents, playlists, websites, articles, books, electronic books, blogs, advertisements, chat sessions, social media, chat rooms, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

As referred to herein, the phrase "in response" should be understood to mean automatically, directly and immediately as a result of, without further input from the user, or automatically based on the corresponding action where intervening inputs or actions may occur.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for providing dynamic in-vehicle content, the method comprising:
    accessing vehicle status data of a vehicle;
    determining, based on a vehicle location from the vehicle status data,predicting a predicted path of the vehicle;
    identifying an intersection device along the predicted path;
    detecting, based on the vehicle location, that the vehicle is within a threshold distance of the intersection device along the predicted path;
    determining, based on the vehicle status data, that a vehicle speed for the vehicle is decreasing within the threshold distance of the intersection device;
    based on detecting that the vehicle is within the threshold distance of the intersection device along the predicted path and determining that the vehicle speed for the vehicle is decreasing within the threshold distance of the intersection device, determining that the vehicle is decelerating along the predicted path within the threshold distance of the intersection device;
    in response to determining that the vehicle is decelerating along the predicted path within the threshold distance of the intersection device:
        identifying, from a content server a geographical location of associated with the intersection device, is associated with a content item; and
        in response to identifying the content item from the content server associated with the intersection device:
            retrieving the content item; and
            causing presentation of the content item via an entertainment device of the vehicle.

2. The method of claim 1, wherein the identifying, from the content server associated with the intersection device, the content item comprises:
    accessing, via the content server, a database of content items mapped to geographical locations; and
    identifying the content item with geographical origin metadata corresponding to the intersection device.

3. The method of claim 2, further comprising:
    accessing a user profile; and
    wherein identifying, from the content server associated with the intersection device, the content item comprises identifying, from the content server, the content item based on user preferences associated with the user profile.

4. The method of claim 1, wherein causing presentation of the content item via the entertainment device of the vehicle comprises:
    identifying an insertion point based on an estimated time for the vehicle to remain within the threshold distance of the intersection device; and
    inserting the content item for presentation at the insertion point.

5. The method of claim 4, further comprising:
    determining the estimated time for the vehicle to remain located within the threshold distance of the intersection device, wherein determining the estimated time for the vehicle comprises:
        accessing a traffic map along the predicted path; and
        calculating a time between arrival and departure from the intersection device based on the traffic map, wherein the content item is presented for the estimated time the vehicle remains located within the threshold distance of the intersection device.

6. The method of claim 1, wherein the content item is presented while the vehicle remains located within the threshold distance of the intersection device.

7. The method of claim 1, wherein the content item comprises an advertisement for a merchant within a distance of the intersection device matching the threshold distance of the intersection device.

8. The method of claim 1, wherein the vehicle status data comprises one or more of velocity, acceleration, altitude, direction, or angular velocity.

9. The method of claim 1, further comprising determining an environmental condition based on information collected from one or more systems of the vehicle, wherein the causing presentation of the content item via the entertainment device of the vehicle is based on the environmental condition.

10. The method of claim 1, wherein predicting determining the predicted path of the vehicle comprises:
retrieving, from the vehicle status data, GPS information for the vehicle;
determining, based on the GPS information, the vehicle location of the vehicle;
identifying a selected destination of the vehicle; and
computing the predicted path of the vehicle based on the vehicle location and the selected destination of the vehicle.

11. A system for providing dynamic in-vehicle content, the system comprising:
an entertainment device of a vehicle configured to present content and
control circuitry configured to:
access vehicle status data of the vehicle;
determine, based on a vehicle location from the vehicle status data, a predicted path of the vehicle;
identify an intersection device along the predicted path;
detect, based on the vehicle location, that the vehicle is within a threshold distance of the intersection device along the predicted path;
determine, based on the vehicle status data, that a vehicle speed for the vehicle is decreasing within the threshold distance of the intersection device;
based on detecting that the vehicle is within the threshold distance of the intersection device along the predicted path and determining that the vehicle speed for the vehicle is decreasing within the threshold distance of the intersection device, determine that the vehicle is decelerating along the predicted path within the threshold distance of the intersection device;
in response to determining that the vehicle is decelerating along the predicted path within the threshold distance of the intersection device:
identify, from a content server ef associated with the intersection device, a content item; and
in response to identifying the content item from the content server associated with the intersection device:
retrieve the content item; and
cause presentation of the content item via the entertainment device of the vehicle.

12. The system of claim 11, wherein the control circuitry is further configured to identify, from the content server associated with the intersection device, is associated with the content item by:
accessing, via the content server, a database of content items mapped to geographical locations; and
identifying the content item with geographical origin metadata corresponding to the intersection device.

13. The system of claim 12, wherein the control circuitry is further configured to:
access a user profile; and
identify, from the content server, the content item based on user preferences associated with the user profile.

14. The system of claim 11, wherein the control circuitry is further configured to cause presentation of the content item via the entertainment device by:
identifying an insertion point based on an estimated time for the vehicle to remain within the threshold distance of the intersection device; and
inserting the content item for presentation at the insertion point.

15. The system of claim 14, wherein the control circuitry is further configured to:
determine the estimated time for the vehicle to remain located within the threshold distance of the intersection device by:
accessing a traffic map along the predicted path; and
calculating a time between arrival and departure from the intersection device based on the traffic map, wherein the control circuitry is configured to cause presentation of the content item for the estimated time the vehicle remains located within the threshold distance of the intersection device.

16. The system of claim 11, wherein the control circuitry is configured to cause presentation of the content item while the vehicle remains located within the threshold distance of the intersection device.

17. The system of claim 11, wherein the content item comprises an advertisement for a merchant within a distance of the intersection device matching the threshold distance of the intersection device.

18. The system of claim 11, wherein the vehicle status data comprises one or more of velocity, acceleration, altitude, direction, or angular velocity.

19. The system of claim 11, wherein the control circuitry is further configured to:
determine an environmental condition based on information collected from one or more systems of the vehicle; and
cause presentation of the content item via the entertainment device of the vehicle based on the environmental condition.

20. The system of claim 11, wherein the control circuitry is configured to determine the predicted path of the vehicle by:
retrieving, from the vehicle status data, GPS information for the vehicle;
determining, based on the GPS information, the vehicle location of the vehicle;
identifying a selected destination of the vehicle; and
computing the predicted path of the vehicle based on the vehicle location and the selected destination of the vehicle.

* * * * *

UNITED STATES PATENT AND TRADEMARK OFFICE
CERTIFICATE OF CORRECTION

| | | |
|---|---|---|
| PATENT NO. | : 11,927,456 B2 | |
| APPLICATION NO. | : 17/331815 | |
| DATED | : March 12, 2024 | |
| INVENTOR(S) | : Akshay Chetan Shah et al. | |

It is certified that error appears in the above-identified patent and that said Letters Patent is hereby corrected as shown below:

In the Claims

Claim 1, Column 18, Line 10, delete "predicting"

Claim 1, Column 18, Lines 29-31, delete "identifying, from a content server a geographical location of associated with the intersection device, is associated with a content item; and" and replace with --identifying, from a content server associated with the intersection device, a content item; and--

Claim 10, Column 19, Line 20, delete "predicting"

Claim 11, Column 19, Line 56, delete "ef"

Claim 11, Column 19, Line 63, delete "of the vehicle"

Claim 12, Column 20, Line 3, delete "is associated with"

Signed and Sealed this
Thirtieth Day of April, 2024

Katherine Kelly Vidal
*Director of the United States Patent and Trademark Office*